United States Patent [19]

Borbas et al.

[11] Patent Number: 4,794,633
[45] Date of Patent: Dec. 27, 1988

[54] MASS POLLING SYSTEM

[75] Inventors: William F. Borbas, Woodridge; Robert W. Walker, Glen Gllyn, both of Ill.

[73] Assignee: Illinois Bell Telephone Company, Chicago, Ill.

[21] Appl. No.: 18,204

[22] Filed: Feb. 24, 1987

[51] Int. Cl.$^4$ .................... H04M 1/64; H04M 11/00; H04M 15/00
[52] U.S. Cl. ........................................ 379/67; 379/92
[58] Field of Search ...................... 379/67, 70, 74, 77, 379/84, 88, 112, 196, 197, 198, 203, 213, 92

[56] References Cited

U.S. PATENT DOCUMENTS

| | | | |
|---|---|---|---|
| 3,347,900 | 10/1967 | Doyle et al. | 379/84 |
| 3,644,675 | 2/1972 | Watlington | 379/92 |
| 3,943,641 | 3/1976 | Dworetzky | 379/92 |
| 4,065,640 | 12/1977 | Rouiller . | |
| 4,122,308 | 10/1978 | Weinberger et al. . | |
| 4,384,175 | 5/1983 | Brown . | |
| 4,451,700 | 5/1984 | Kempner et al. | 379/92 |
| 4,585,904 | 4/1986 | Mincone et al. . | |
| 4,611,094 | 9/1986 | Asmuth et al. . | |
| 4,696,029 | 9/1987 | Cohen | 379/112 |

Primary Examiner—Raymond F. Cardillo
Assistant Examiner—James E. Tomassini
Attorney, Agent, or Firm—Willian Brinks Olds Hofer Gilson & Lione Ltd.

[57] ABSTRACT

A mass polling system is situated in a central office of a telephone system, and does not employ toll machines or trunk lines leading to toll machines. The mass polling system ensures that a charge record is generated before the beginning of a recorded announcement, during the period while the caller is receiving an audible ring signal. Preferably, the charge record is generated at the initiation of the audible ring signal. In this way billing errors due to early caller disconnect are reduced or eliminated. The mass polling system is responsive to a billing disable command which prevents the mass polling system from causing charge records to be generated when the mass polling system is out of service.

10 Claims, 5 Drawing Sheets

MASS POLLING SYSTEM

BACKGROUND OF THE INVENTION

This invention relates to improvements to mass polling systems which allow increased efficiency of operation. As used herein, the term "mass polling system" signifies a telephone system in which the number of incoming calls to a selected telephone number is tabulated and a recorded message is presented to each caller.

Mass polling systems are used for example when it is desired to register public response to a selected question. For example, a television program can present a question of public interest, inviting members of the public to call a first number to register an affirmative response and a second, separate telephone number to register a negative response to the question. Callers telephone one or the other of the two numbers, depending upon their position on the question, and then automatic equipment registers the total number of calls answered at each number.

One approach currently used to implement a mass polling system is that provided by AT & T, in which calls are routed from the originating central office over trunks to toll machines. The toll machines present a recorded answer to each call, generate a charge record which causes the caller to be billed for the call, and tabulate the number of calls answered at each number.

One disadvantage to this approach is that the number of trunks between any given central office and the appropriate toll machine is typically much less than the number of trunks required to handle the number of incoming calls to the system during peak calling periods. When this is the case, many of the calls are not completed and the tabulation does not accurately reflect the number of callers who have attempted to register their opinion.

Another disadvantage of such prior art mass polling systems is that billing decisions are typically made approximately two seconds after a call has been answered and automatic playback of a recorded message has been initiated. Callers who are aware of this fact can register their opinion without being charged for the call simply by hanging up after the playback of the prerecorded message has started but before the two second interval has elapsed.

SUMMARY OF THE INVENTION

The present invention is directed to improved circuitry for a mass polling system which to a large extent overcomes the aforementioned disadvantages.

According to a first feature of the invention, a telephone mass polling system generates a charge record during the period when the caller is receiving a ring signal, prior to the initiation of the prerecorded message. Preferably, a charge signal is generated at substantially the same time that the ring signal begins. In this way, the billing decision is made at an earlier point in the call, and the number of callers who successfully register a vote without being charged for the call is reduced or eliminated.

According to a second feature of this invention, the charge signal generating means in a mass polling system is provided with means for disabling the means for generating the charge signal in response to a control signal. This disabling means can be used to ensure that charge signals will not be generated during periods when the mass polling system is not in operation. In this way, charges can be linked more accurately to recorded votes in a mass polling system.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
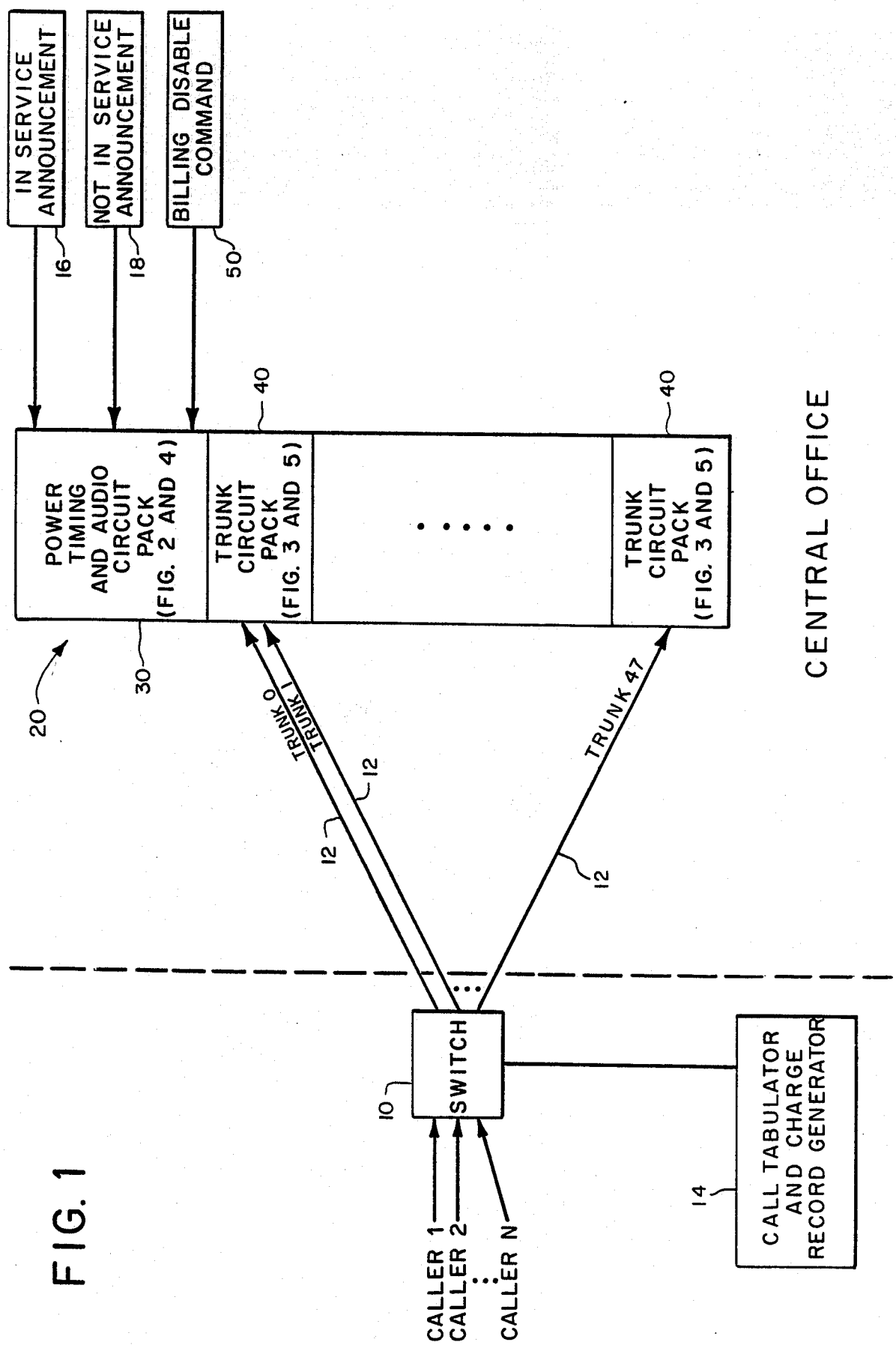
FIG. 1 is a block diagram of a mass polling system which incorporates a presently preferred embodiment of this invention.

Turning now to the drawings, FIG. 1 shows a block diagram of a mass polling system which incorporates a presently preferred embodiment of this invention. The present invention is implemented in the power, timing and audio circuit 30, the trunk 40, and the billing disable circuit 50, and the remaining portions of FIG. 1 are provided merely to define the environment of this invention.

As shown in FIG. 1, incoming calls for a given mass polling telephone number are routed via a conventional switch 10 to one of a plurality of trunks 12. In this embodiment 48 separate trunks 12 are provided, though it should be understood that a greater or smaller number of trunks can be provided in alternate embodiments. The switch 10 directs incoming calls to any available one of the trunks 12. Each of the trunks 12 terminates at a respective one of the trunk circuits 40. A call tabulator and charge record generator 14 monitors the activity on each of the trunks 12. This call tabulator and charge record generator 14 includes conventional means (not shown) for recording the total number of calls handled on the trunks 12 and for generating a charge record for each of the calls handled on the trunks 12 in response to battery reversal on the trunk. The detailed structure and operation of the call tabulator and charge record generator 14 does not per se form part of this invention and will therefore not be described in greater detail here. Such devices have been used for some time in commercial telephone systems and are well known to those skilled in the art.

The embodiment of FIG. 1 also includes an in service announcement system 16 and a not in service announcement system 18. These two systems 16, 18 are conventional devices for playing back prerecorded messages, which in this embodiment have a duration between 1 and 99 seconds. Once again, suitable devices for playing back such messages are well known to those skilled in the art and do not per se form part of this invention. For example, conventional playback systems such as Model 13A of Western Electric are suitable.

The preferred embodiment of FIG. 1 includes a trunk and control circuit 20 which includes a power, timing and audio circuit 30 and up to twelve separate trunk circuits 40. Each of the trunk circuits 40 handles calls on four respective ones of the normal outgoing trunks 12.

The trunk and control circuit 20 provides local answer supervision on calls to recorded announcements from normal outgoing trunks. This circuit is designed to activate the originating office billing equipment included in the device 14 on calls with very short holding times, thereby avoiding billing errors due to early disconnect. The trunk and control circuit 20 serves as a distribution point for trunk circuits 40 for up to forty-eight trunks 12 from a single announcement feed. FIGS. 2-5 provide a detailed description of the circuitry of the power, timing and audio circuit 30 and one of the trunk circuits 40.

Figure 2:
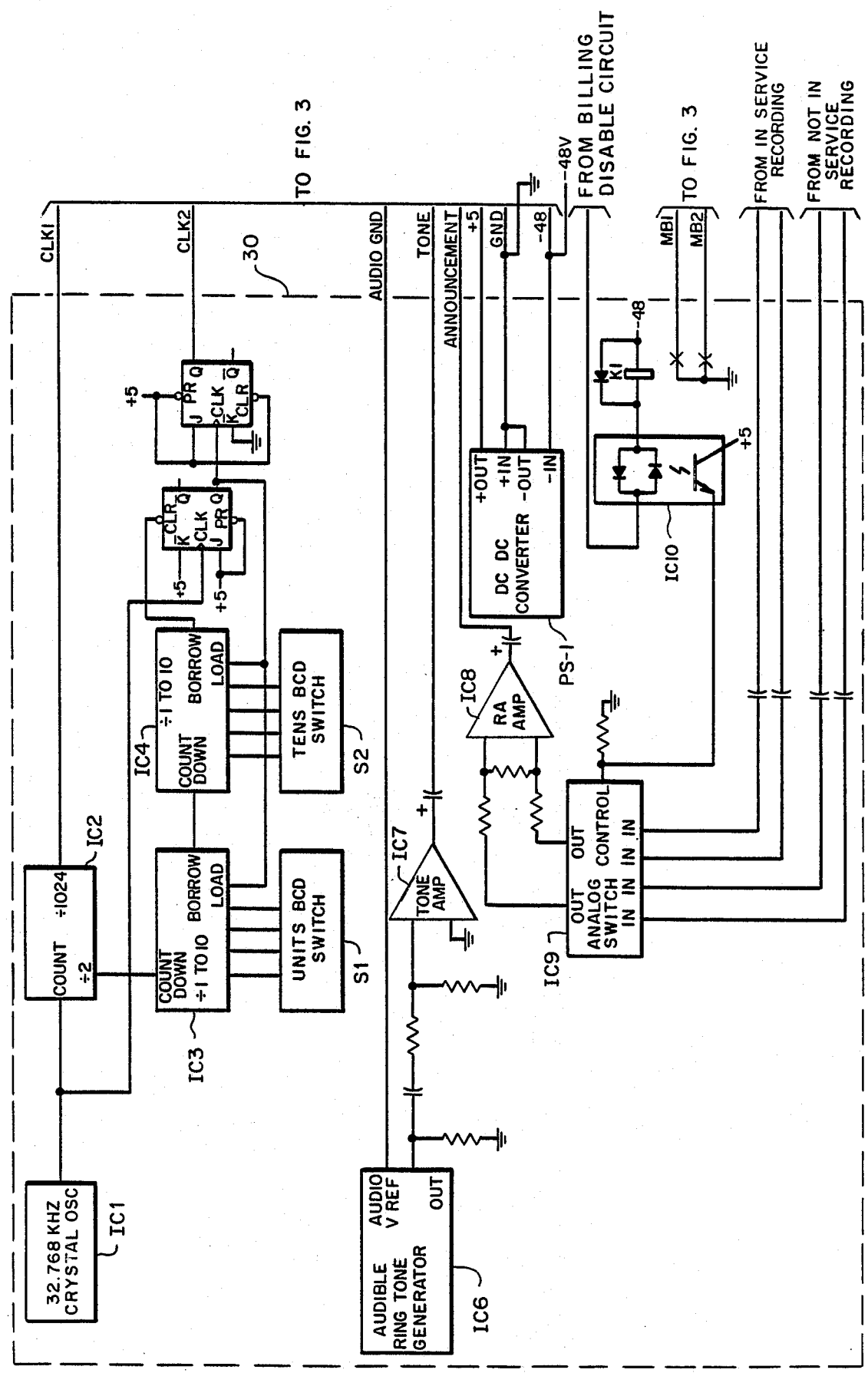
FIG. 2 is a block diagram of the power, timing and audio circuit of FIG. 1.

As shown in FIG. 2, the power, timing and audio circuit 30 receives audio inputs from the in service recording system 16 and from the not in service recording system 18. In addition, the power, timing and audio circuit receives −48 volt and ground inputs as well as a control signal from a billing disable circuit 50. The purpose of this control signal is described below.

The power, timing and audio circuit 30 includes a crystal oscillator IC1 which supplies a periodic signal to a counter IC2 that generates a first clock signal CLK1 at 32 Hz. In addition, the counter IC2 presents the clock signal divided by 2 to a counter system made up of counters IC3, IC4. Each of the counters IC3, IC4 is a divide by 1-10 counter, and the operation of the counters IC3, IC4 is controlled by respective BCD switches S1, S2. The switches S1, S2 can be manually set to any value between 1 and 99 in order to alter the frequency of the resulting second clock signal CLK2 to any value between 8192 and 82.75 Hz. The clock signals CLK1, CLK2 are used by the trunk circuit 40 as described below.

The power, timing and audio circuit 30 also includes an audible ring tone generator IC6 which supplies an audio ground as well as a ring tone signal that is amplified by amplifier IC7 and supplied as an output signal. The tone amplifier IC7 allows the amplitude of the tone signal to remain constant under varying loads.

The power, timing and audio circuit 30 also includes a power supply PS1 which includes a DC to DC converter for converting the −48 volt input to a +5 volt signal used to power logic circuits in the circuits 30, 40.

The audio signals from the in service recording system 16 and the not in service recording system 18 are applied to respective inputs of an analog switch IC9. The analog switch IC9 selects one of the two sets of inputs to be passed to a recorded announcement amplifier IC8. The output of the recorded announcement amplifier IC8 is supplied as an announcement output signal.

The control signal from the billing disable circuit 50 is a two-state signal which controls the analog switch IC9 via an opto-isolator included in the integrated circuit IC10. Thus, the state of the control signal received from the billing disable circuit 50 determines whether the analog switch IC9 passes the in service recording or the not in service recording to the recorded announcement amplifier IC8. In addition, the control signal from the billing disable circuit 50 controls a relay K1. The contacts of the relay K1 are normally open, thus isolating the leads MB1 and MB2 from ground. However, when the control signal from the billing disable circuit 50 energizes the relay K1, the normally open contacts are closed, thus connecting both of the terminals MB1 and MB2 to ground.

Figure 3:
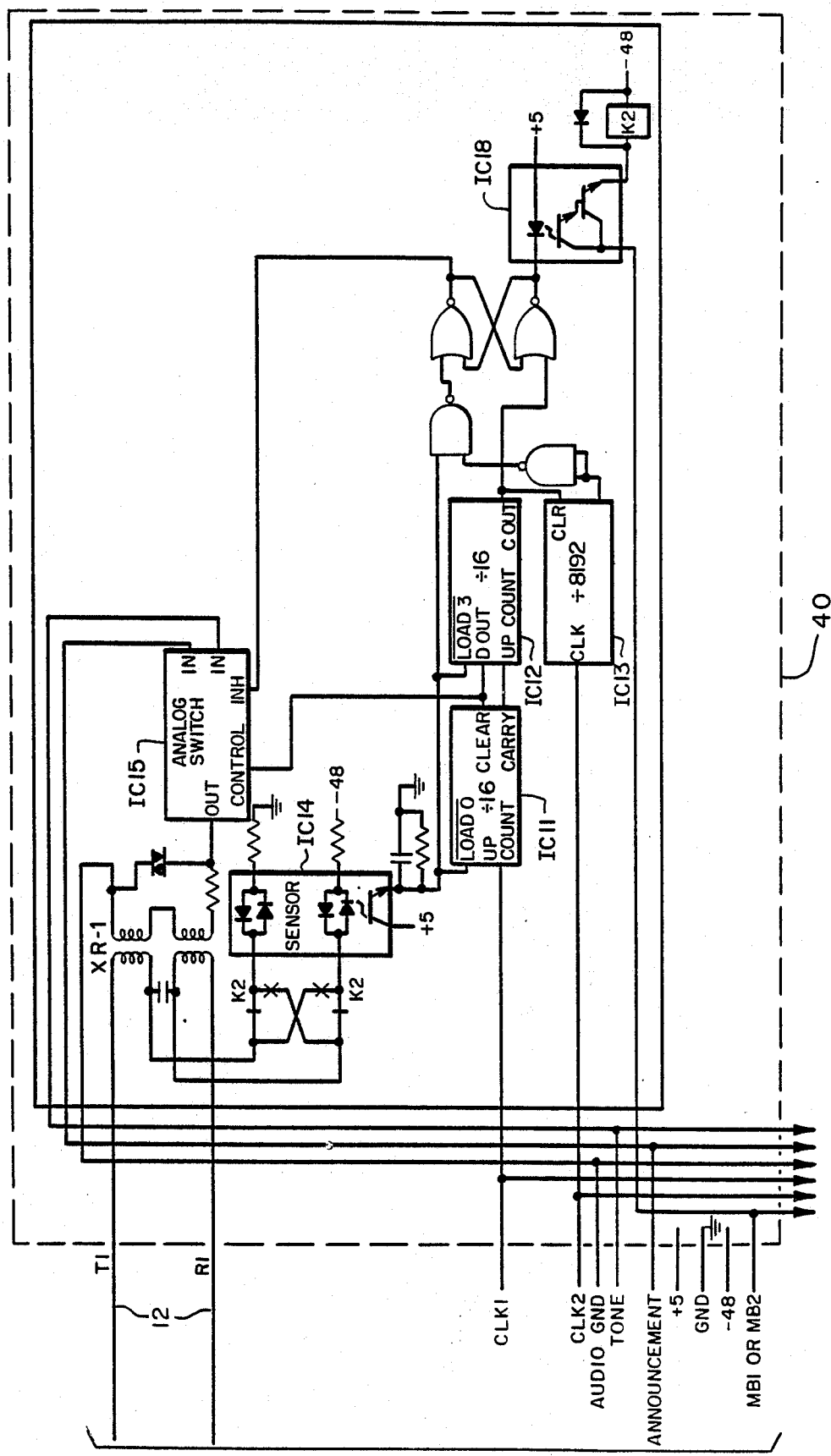
FIG. 3 is a block diagram of one of the trunk circuits of FIG. 1.

FIG. 3 shows a block diagram of a portion of one of the trunk circuits 40. Each of the trunk circuits 40 includes circuitry for handling four separate trunks, and FIG. 3 shows only the circuitry used for single trunk.

The circuit of FIG. 3 includes a transformer XR-1 which is coupled to the tip and ring leads T1, R1 of the respective trunk 12. The tip and ring leads T1, R1 are connected via the transformer XR-1, a relay K2 and a sensor IC14 to −48 volts and ground, respectively, when the relay K2 is not energized. An analog switch IC15 receives respective inputs from the tone and announcement outputs of the circuit 30. The analog switch IC15 selects one of these two inputs to be applied via the transformer XR-1 to the trunk 12.

The sensor IC14 senses when the trunk 12 is seized by an incoming call. The circuit of FIG. 3 includes a pair of counters IC11, IC12. The counter IC11 is responsive to CLK1 and the counter IC12 is responsive to the carry output of the counter IC11. When the sensor IC14 detects a seizure, the counters IC11, IC12 are released. After 16 pulses of CLK1 (500 msec) the "C" output of the counter IC12 causes the relay K2 to be energized. When energized, relay K2 reverses the battery and ground connection to the originating trunk 12 and releases the inhibit control to the analog switch IC15 in order to cause the audible ring signal to be passed via the analog switch IC15 to the trunk 12. Two seconds later, the "D" output of counter IC12 causes the analog switch IC15 to stop passing the ring signal to the trunk 12 and to begin passing the announcement to the trunk 12. The "C" output of the counter IC12 enables a counter IC13 which counts clock pulses CLK2. After 8192 cycles of CLK2 have been counted, the counter IC13 releases the relay K2 and inhibits the analog switch IC15 from transmitting either the ring signal or the announcement to the trunk 12.

The input MB1, MB2 enables or disables the relay K2. In the event the input MB1, MB2 is not grounded, the relay K2 cannot be energized and polarity on the trunk 12 cannot be reversed.

Figure 4:
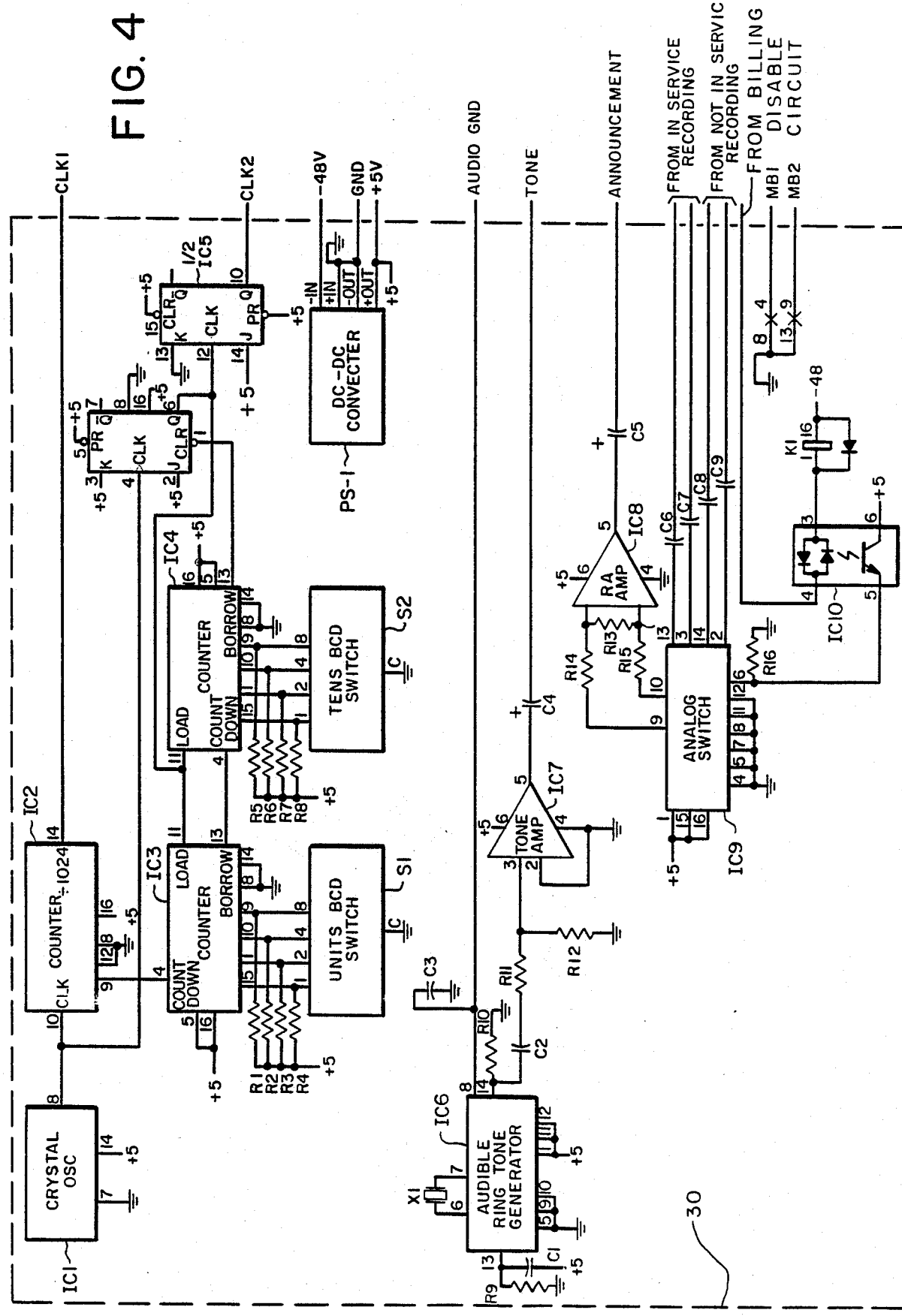
FIG. 4 is a detailed schematic diagram of the power, timing and audio circuit of FIG. 2.
Figure 5:
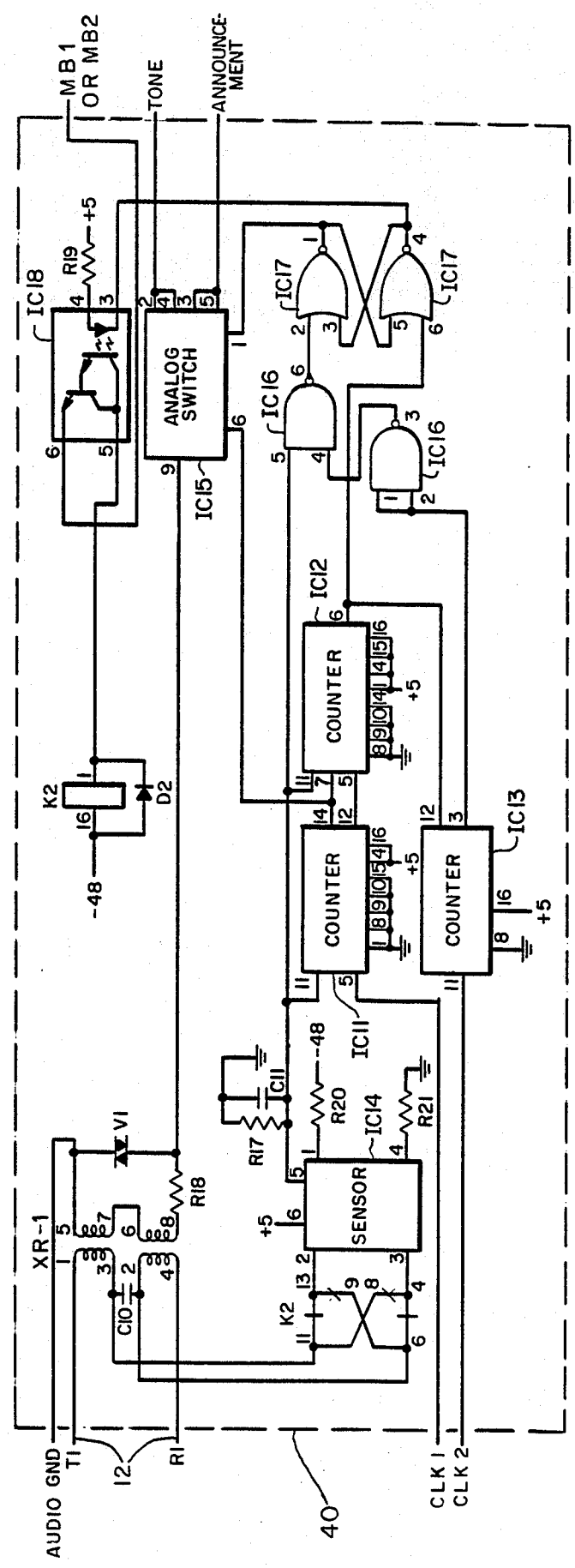
FIG. 5 is a detailed schematic diagram of th trunk circuit of FIG. 3.

FIGS. 4 and 5 provide detailed schematic diagrams of the circuits of FIGS. 2 and 3, respectively. Tables 1 and 2 identify the circuit components used in FIGS. 4 and 5, respectively, for this preferred embodiment.

TABLE 1

| COMPONENT DESIGNATION (FIG. 4) | DESCRIPTION |
| --- | --- |
| A. CAPACITORS | |
| C1 | .1 μF CER |
| C2, C6, C7, C8, C9 | .47 μF CER |
| C3 | 1000 μF 16 V |
| C4, C5 | 250 μF 16 V |
| B. CRYSTAL | |
| X1 | 3.579 MHZ |
| C. POWER SUPPLY | |
| PS1 | PM-741, PACKAGED POWER |
| D. RESISTORS | |
| R1-R8, R11 | 47K, ¼ W |
| R9, R12 | 15K, ¼ W |
| R10 | 1K, ¼ W |
| R13 | 560Ω, ¼ W |
| R14-R15 | 1200Ω, ¼ W |
| R16 | 5.6K |
| E. SWITCH | |
| S1-S2 | PICO-137-AK, ALCO SWITCH |
| F. INTEGRATED CIRCUITS | |
| IC1 | 32.768 KHZ OSC |
| IC2 | 74HC4020 |
| IC3-IC4 | 74HC192 |
| IC5 | 74HC109 |

TABLE 1-continued

| COMPONENT DESIGNATION (FIG. 4) | DESCRIPTION |
| --- | --- |
| IC6 | M-991 TELETONE CORP |
| IC7-IC8 | LM 386 |
| IC9 | CD4529B |
| IC10 | LDA200 THETA-J CORP |
| G. RELAY | |
| K1 | RZ-48 ITT |
| H. DIODE | |
| D1 | IN4004 |

TABLE 2

| COMPONENT DESIGNATION (FIG. 5) | DESCRIPTION |
| --- | --- |
| A. CAPACITORS | |
| C10 | 2 µF |
| C11 | 1 µF, TANT |
| B. INTEGRATED CIRCUITS | |
| IC11 | 74HC193 |
| IC12 | 74HC193 |
| IC13 | 74HC4060 |
| IC14 | LDA-200, THETA-J CORP |
| IC15 | CD4529B |
| IC16 | 74HC00 |
| IC17 | 74HC02 |
| IC18 | 2B OPTO ISOLATOR, WECO |
| C. DIODE | |
| D2 | 533F, WECO |
| D. VARISTOR | |
| V1 | 106A, WECO |
| E. RESISTORS | |
| R17 | 56K, ¼ W |
| R18 | 1K, ¼ W |
| R19 | 1K, ¼ W |
| R20 | 1K, 2 W |
| R21 | 1K, 2 W |
| F. TRANSFORMER | |
| XR-1 | 2586H, WECO |
| G. RELAY | |
| K2 | RZ-48 |

The power, timing and audio circuit 30 provides a 5 volt signal, clock signals CLK1, CLK2, control signals MB1, MB2 and tone and announcement signal distribution for up to 48 trunk circuits. The DC-DC converter PS-1 is used to provide the 5 volt signal from −48 volts. The two clock signals CLK1, CLK2 provide the timing required for trunk control. CLK1 controls the 500 millisecond delay after seizure before the relay K2 is energized, and the two second period during which the audible ring signal is provided to the outgoing trunk. CLK2 controls the length of the recorded announcement. The frequency of the clock signal CLK2 is controlled by the BCD switches S1, S2. The control signal from the billing disable circuit 50 isolates the terminals MB1, MB2 from ground and switches the not in service announcement to the recorded announcement amplifier IC8. The audible ring signal is provided by a single integrated audible ring tone generator IC8 and is equalized for distribution to the trunk circuits 40. The recorded announcement presented on the announcement terminal is also equalized for distribution by means of the amplifier IC8.

The sensor IC14 of the trunk circuit of FIG. 3 monitors the outgoing trunk 12 for a seizure. When the outgoing trunk 12 is seized, the sensor IC14 releases the counters IC11, IC12. This causes the ring signal to be presented to the outgoing trunk 12 after delay of 500 milliseconds. The ring signal is presented to the outgoing trunk 12 for a total of two seconds, and then the recorded announcement on the announcement terminal is presented to the outgoing trunk for a time period as determined by the switches S1, S2. In the event the MB1, MB2 terminals are grounded, the relay K2 reverses polarity on the trunk 12 simultaneously with the first presentation of a ring signal to the trunk 12. After the timer IC13 has timed out the relay K2 is released, thereby transmitting an on-hook signal via the trunk 12.

It should be understood that reversing polarity on the trunk 12 causes the call tabulator and charge record generator 14 both to tabulate the call and to generate a charge record that will cause the caller to be billed for the call. Thus, the billing errors associated with early termination of the call by the caller are eliminated.

The billing disable command simultaneously performs two functions. It substitutes the not in service announcement for the in service announcement and it disables the relay K2. When the relay K2 is disabled the polarity of the trunk 12 cannot be reversed and a charge record will not be generated by the call tabulator and charge record generator 14. For example, if a mass polling systems is to be operated only for a selected time period, as for example between 8 and 9 pm on a given day, the billing disable command can be used to prevent calls to the mass polling system from being charged to the caller outside of the preselected time period.

From the foregoing description it should be apparent that an improved mass polling system has been described which provides important advantages. Because the entire mass polling system is located at the central office, toll machines and trunks leading to toll machines are avoided. In this way, it is possible to handle a large surge of calls efficiently with a minimum number of busy signals. Furthermore, the charge record is generated unusually early in the call, while the caller is being presented with a ring signal. In the preferred embodiment described above, the charge record is actually generated simultaneously with the initiation of the ring signal. This reduces or eliminates billing errors associated with early call termination. Moreover, the billing disable command allows the mass polling system to be easily removed from generating charge records when the mass polling system is not in service. All of these advantages are obtained in a remarkably simple and efficient circuit which can readily be implemented in a reliable manner.

Of course, it should be understood that a wide range of changes and modifications can be made to the preferred embodiment described above. It is therefore intended that the foregoing detailed description be regarded as illustrative rather than limiting, and that it be understood that is the following claims, including all equivalents, which are intended to define the scope of this invention.

We claim:

1. In a telephone mass polling system of the type comprising means for switching calls for a selected telephone number to at least one trunk, means for tabulating calls to said selected telephone number, means for presenting callers to said selected telephone number with a recorded message, and means for generating a charge record for calls to said selected telephone number in response to a charge signal, the improvement comprising:

first means for monitoring said at least one trunk for a seizure indicative of a call on the trunk;

second means, responsive to the monitoring means, for presenting a ring signal for a selected time interval to said trunk in response to said seizure; and third means for generating the charge signal for said charge record generating means prior to expiration of said selected time interval, such that the charge signal is generated while the ring signal is being presented to said trunk line.

2. The invention of claim 1 wherein the third means generates the charge signal at the beginning of the ring signal.

3. The invention of claim 1 further comprising means for receiving a control signal and means for disabling the third means in response to the control signal such that the third means is prevented from generating the charge signal when the control signal is in a selected state.

4. The invention of claim 3 further comprising:

means for automatically replacing the recorded message with a not in service message when the control signal is in said selected state.

5. The invention of claim 1 wherein the first, second and third means and the message presenting means are all situated at one central telephone office.

6. In a telephone mass polling system of the type comprising means for switching calls for a selected telephone number to at least one trunk, means for tabulating calls to said selected telephone number, means for presenting callers to said selected telephone number with a recorded message, and means for generating a charge record for calls to said selected telephone number in response to a charge signal, the improvement comprising:

means for generating the charge signal for the charge record generating means subsequent to a seizure indicative of an incoming call on the trunk line;

means for receiving a control signal; and means for disabling the charge generating means in response to the control signal such that the charge generating means is prevented from generating the charge signal when the control signal is in a selected state.

7. The invention of claim 6 further comprising:

means for automatically replacing the recorded message with a not in service message when the control signal is in said selected state.

8. The invention of claim 6 further comprising means for presenting a ring signal to said trunk in response to said seizure, wherein the charge signal generating means generates the charge signal at the start of the ring signal.

9. In a telephone mass polling system of the type comprising means for switching calls for a selected telephone number to at least one trunk, means for tabulating calls to said selected telephone number, means for presenting callers to said selected telephone number with a recorded message, and means for generating a charge record for calls to said selected telephone number in response to a charge signal, the improvement comprising:

means for generating first and second clock signals;

means for generating an announcement signal;

means for generating a tone signal;

means for sensing a seizure of the trunk;

first counter means for counting the first clock signal;

second counter means for counting the second clock signal, and for generating a count signal after a selected number of periods of the second clock signals;

an analog switch having an output coupled to the trunk, a first input coupled to received the announcement signal, and a second input coupled to receive the tone signal;

a relay coupled to the trunk and operative to reverse polarity of the trunk when energized in order to generate the charge signal;

means, responsive to the first counter means, for simultaneously energizing the relay and controlling the switch to present the tone signal to the trunk a selected time period after trunk seizure has been detected by the sensing means;

means, responsive to the first counter means, for controlling the switch to present the announcement signal to the trunk after the tone signal; and means, coupled to the second counter means, for de-energizing the relay in response to the count signal.

10. The invention of claim 9 further comprising means, responsive to a control signal, for disabling the relay energizing means when the control signal is in a selected state.

* * * * *

UNITED STATES PATENT AND TRADEMARK OFFICE
CERTIFICATE OF CORRECTION

PATENT NO. : 4,794,633
DATED : December 27, 1988
INVENTOR(S) : William F. Borbas et al.

It is certified that error appears in the above-identified patent and that said Letters Patent is hereby corrected as shown below:

On the cover page under the heading "Inventors," please delete "Gllyn" and substitute therefor --Ellyn--.

IN THE SUMMARY OF THE INVENTION

In column 2, line 18, please delete "th" and substitute therefor --the--.

IN THE DETAILED DESCRIPTION OF
THE PRESENTLY PREFERRED EMBODIMENTS

In column 2, line 27, after "trunk" please insert --circuits--.

In column 6, line 45, please delete "removed" and substitute therefor --prevented--.

In column 6, line 56, after "that" please insert --it--.

UNITED STATES PATENT AND TRADEMARK OFFICE
CERTIFICATE OF CORRECTION

PATENT NO. : 4,794,633
DATED : December 27, 1988
INVENTOR(S) : William F. Borbas et al.

It is certified that error appears in the above-identified patent and that said Letters Patent is hereby corrected as shown below:

IN THE CLAIMS

In column 8, line 26, please delete "signals" and substitute therefor --signal--.

In column 8, line 28, please delete "received" and substitute therefor --receive--.

Signed and Sealed this

Twentieth Day of August, 1991

Attest:

HARRY F. MANBECK, JR.

Attesting Officer

Commissioner of Patents and Trademarks